(12) United States Patent
Nobuhira

(10) Patent No.: US 7,981,179 B2
(45) Date of Patent: Jul. 19, 2011

(54) AIR CLEANER, ENGINE UNIT AND STRADDLE-TYPE VEHICLE

(75) Inventor: Takayuki Nobuhira, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 469 days.

(21) Appl. No.: 12/193,912

(22) Filed: Aug. 19, 2008

(65) Prior Publication Data

US 2009/0050095 A1 Feb. 26, 2009

(30) Foreign Application Priority Data

Aug. 20, 2007 (JP) ................. 2007-214108

(51) Int. Cl.
B01D 46/10 (2006.01)
(52) U.S. Cl. .................. 55/385.3; 123/198 E
(58) Field of Classification Search .............. 55/385.3, 55/480, 481, 497, 502, 511, DIG. 28; 123/54.4, 123/184.21, 198 E; 180/68.1, 68.2, 68.3, 180/219, 225, 229, 346; 280/280.1
See application file for complete search history.

(56) References Cited

U.S. PATENT DOCUMENTS

| 4,056,376 | A | 11/1977 | Schuldenfrei | |
|---|---|---|---|---|
| 5,494,497 | A * | 2/1996 | Lee | 55/480 |
| 6,287,354 | B1 * | 9/2001 | Nozaki | 55/385.3 |
| 6,564,768 | B2 * | 5/2003 | Bauer et al. | 123/198 E |
| 7,410,025 | B2 * | 8/2008 | Sunaguchi et al. | 180/229 |
| 7,647,995 | B2 * | 1/2010 | Ishida et al. | 180/68.1 |
| 2005/0051375 | A1 * | 3/2005 | Momosaki | 180/219 |
| 2006/0272509 | A1 | 12/2006 | Uemura et al. | |
| 2007/0023214 | A1 | 2/2007 | Ishida et al. | |
| 2008/0053394 | A1 * | 3/2008 | Tsutsui et al. | 123/184.21 |
| 2009/0050386 | A1 * | 2/2009 | Nobuhira | 180/68.2 |
| 2009/0241868 | A1 * | 10/2009 | Morita et al. | 123/54.4 |

FOREIGN PATENT DOCUMENTS

| DE | 201 08 544 U1 | 10/2002 |
|---|---|---|
| EP | 1 927 792 A2 | 6/2008 |
| JP | 59-77924 A | 5/1984 |
| JP | 07-125669 | 5/1995 |

OTHER PUBLICATIONS

Official Communication issued in corresponding European Search Report Application No. 08 01 4784, completed on Dec. 17, 2010.

* cited by examiner

*Primary Examiner* — Duane Smith
*Assistant Examiner* — Minh-Chau Pham
(74) *Attorney, Agent, or Firm* — Keating & Bennett, LLP

(57) ABSTRACT

An air cleaner includes an air intake port and an exhaust port on a side opposite to the intake port. A filter extends to the exhaust port side from the intake port side and divides the air cleaner into suction side and exhaust side air chambers. A distance between a side wall part of the suction side air chamber and the filter gradually decreases to the back of the suction side air chamber from the intake port. A distance between a side wall part of the exhaust side air chamber and the filter gradually increases to the exhaust port.

8 Claims, 11 Drawing Sheets

AIR CLEANER, ENGINE UNIT AND STRADDLE-TYPE VEHICLE

RELATED APPLICATIONS

This application claims the benefit of priority under 35 USC 119 of Japanese patent application no. 2007-214108, filed on Aug. 20, 2007, which is hereby incorporated by reference.

BACKGROUND OF THE INVENTION

1. Field of the Invention

The present invention relates to an air cleaner for a vehicle, and in particular to the shape of the air cleaner.

2. Description of Related Art

In an air cleaner for a vehicle, the inside of a box-shaped case is generally divided by a filter into an intake port side air chamber (suction side air chamber) and an exhaust port side air chamber (discharge side air chamber). See, for example, Japanese Unexamined Patent Publication No. 07-125669.

However, in a conventional air cleaner, smooth flow of air is easily hindered. The filter is generally disposed to face the passing direction of air flowing into the suction side air chamber. Therefore, when the layout of the vehicle does not permit the passing cross section area of the air to be extended, the filter area must be decreased, and the filter becomes clogged after only a short period of use.

On the other hand, when a filter 101 extends along an inflow direction C1 of air inflowing from an intake port 102, as in an air cleaner 100 shown in FIG. 11, the filter area can be increased without extending the passing cross section area of air, and the smooth flow of air can be maintained over a long period of time.

However, since a wall 103 constituting an air chamber is provided in parallel with filter 101 in air cleaner 100 of FIG. 11, the flow of air is disturbed in the back of a suction side air chamber R1, and smooth flow of air to a discharge side air chamber R2 from suction side air chamber R1 may be hindered.

SUMMARY OF THE INVENTION

The present invention addresses these problems and provides a smoothly flowing air cleaner in an engine unit for a straddle-type vehicle.

An air cleaner according to the present invention includes an intake port leading outside air into a case. An exhaust port is provided on a side of the case opposite to the intake port. A filter divides the case into a suction side air chamber into which outside air flows from the intake port and an exhaust side air chamber discharging air from the exhaust port. The filter extends to the exhaust port side from the intake port side. A distance between a wall part of the suction side air chamber and the filter gradually decreases to the back of the suction side air chamber from the intake port, and a distance between a wall part of the exhaust side air chamber and the filter gradually increases to the exhaust port.

An engine unit according to the present invention includes a case leading outside air from the air cleaner and a continuously variable transmission stored in the case. A straddle-type vehicle according to the invention includes the air cleaner.

According to the present invention, air smoothly flows to the discharge side air chamber from the suction side air chamber of an air cleaner.

Other features and advantages of the invention will be apparent from the following detailed description, taken in conjunction with the accompanying drawings that illustrate, by way of example, various features of embodiments of the invention.

DETAILED DESCRIPTION OF THE INVENTION

Figure 1:
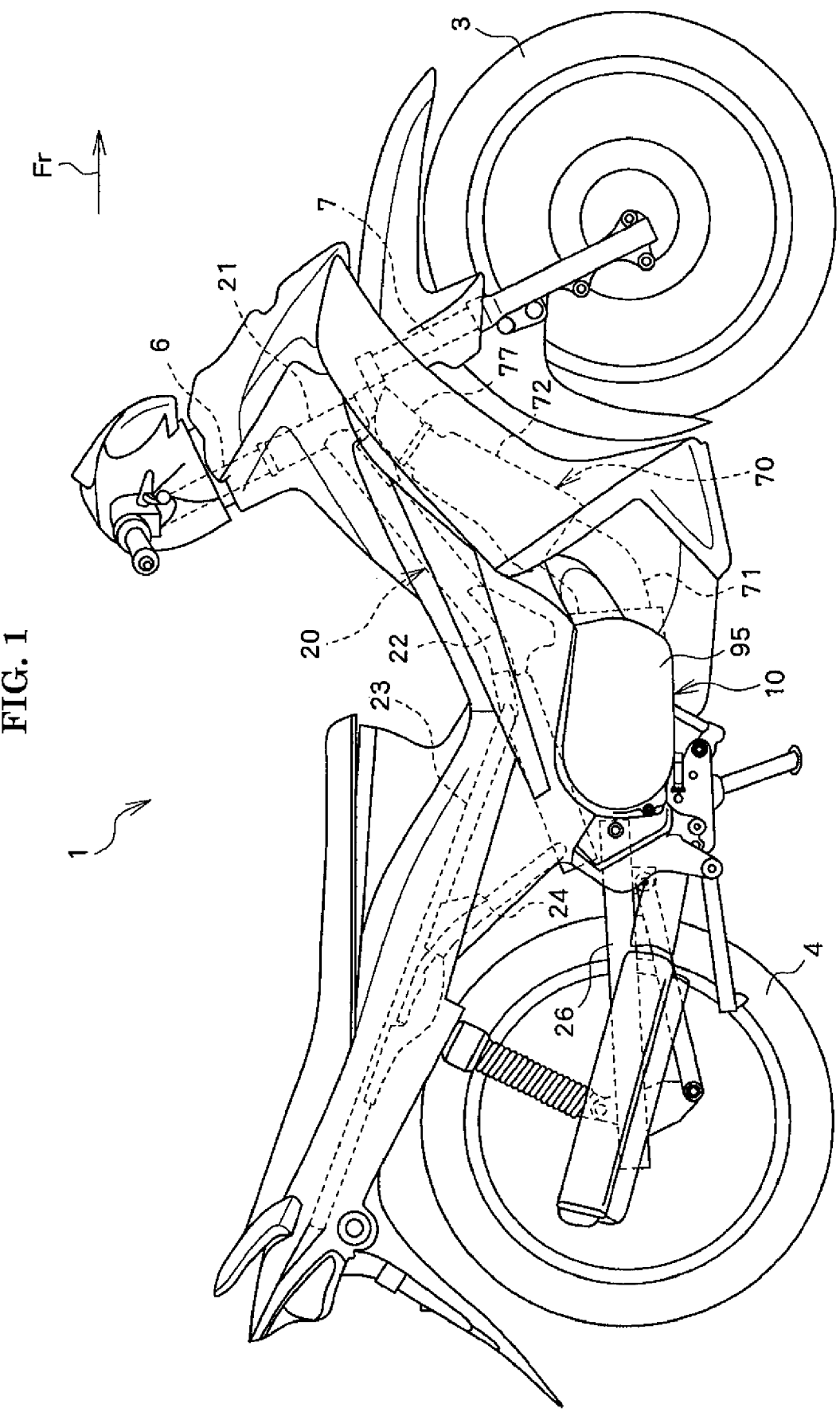
FIG. 1 is a side view of a motorcycle provided with an air cleaner according to an embodiment of the present invention.
Figure 2:
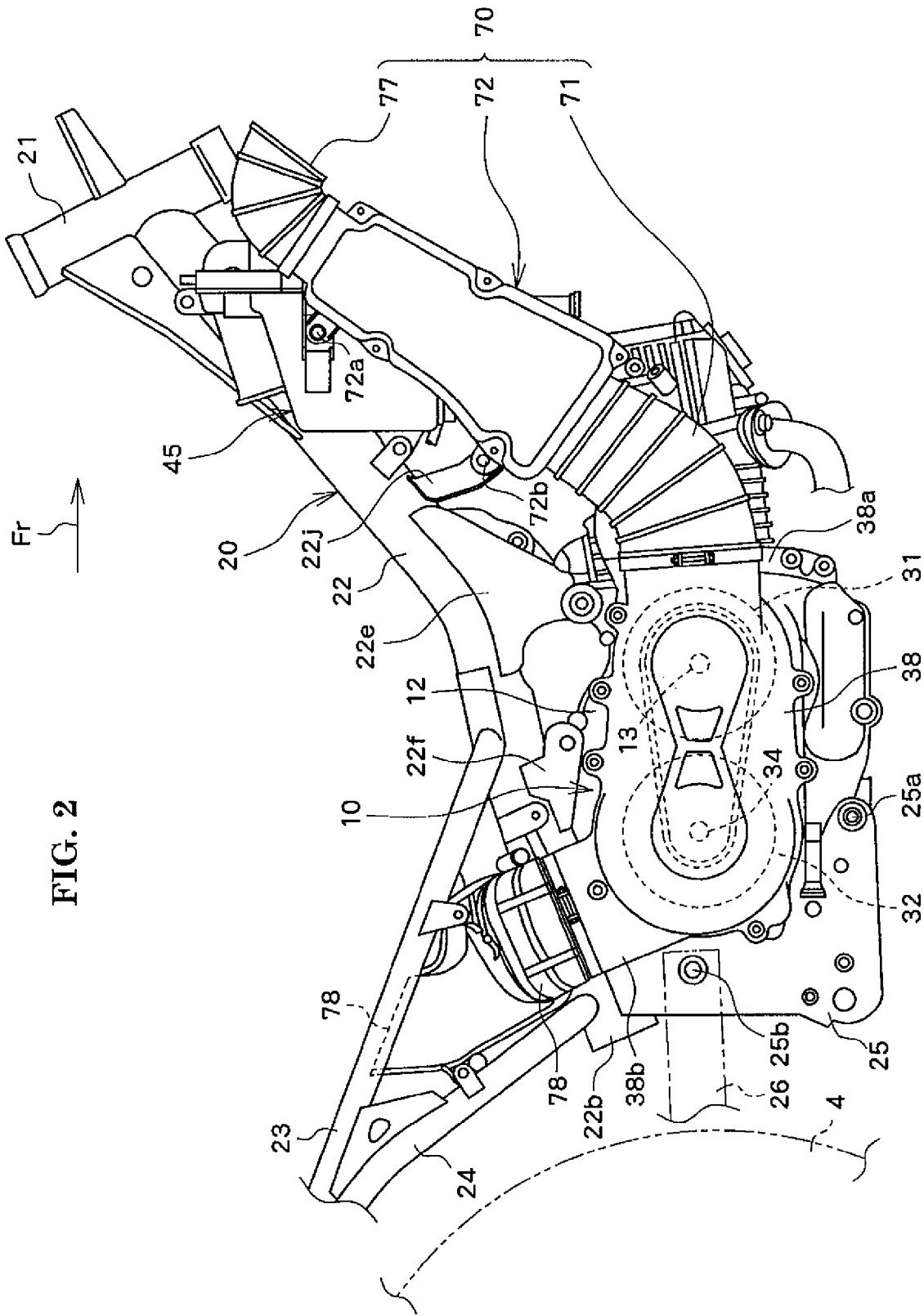
FIG. 2 is a side view showing a vehicle body frame and an engine unit of the motorcycle.
Figure 3:
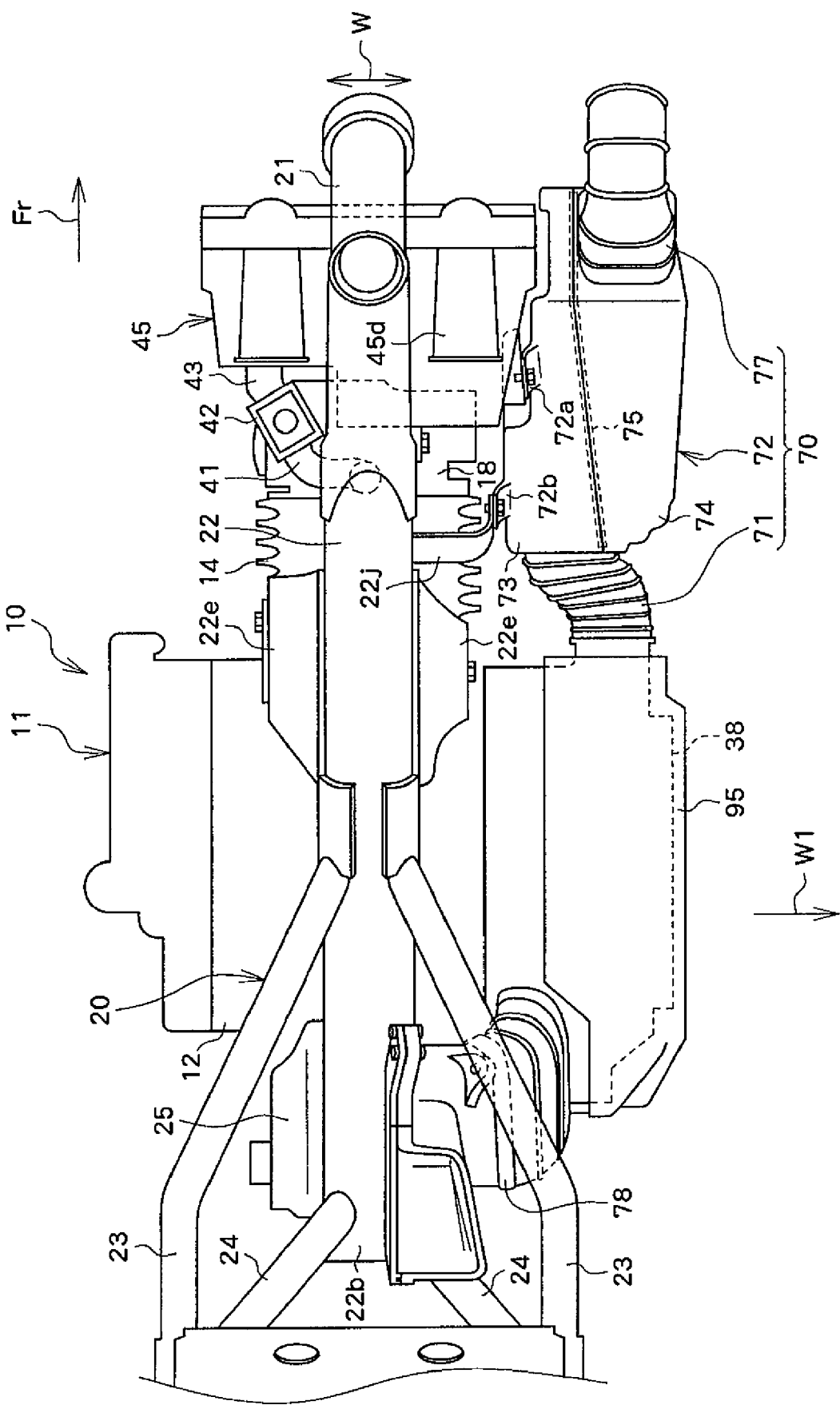
FIG. 3 is a plan view showing the vehicle body frame and the engine unit.
Figure 4:
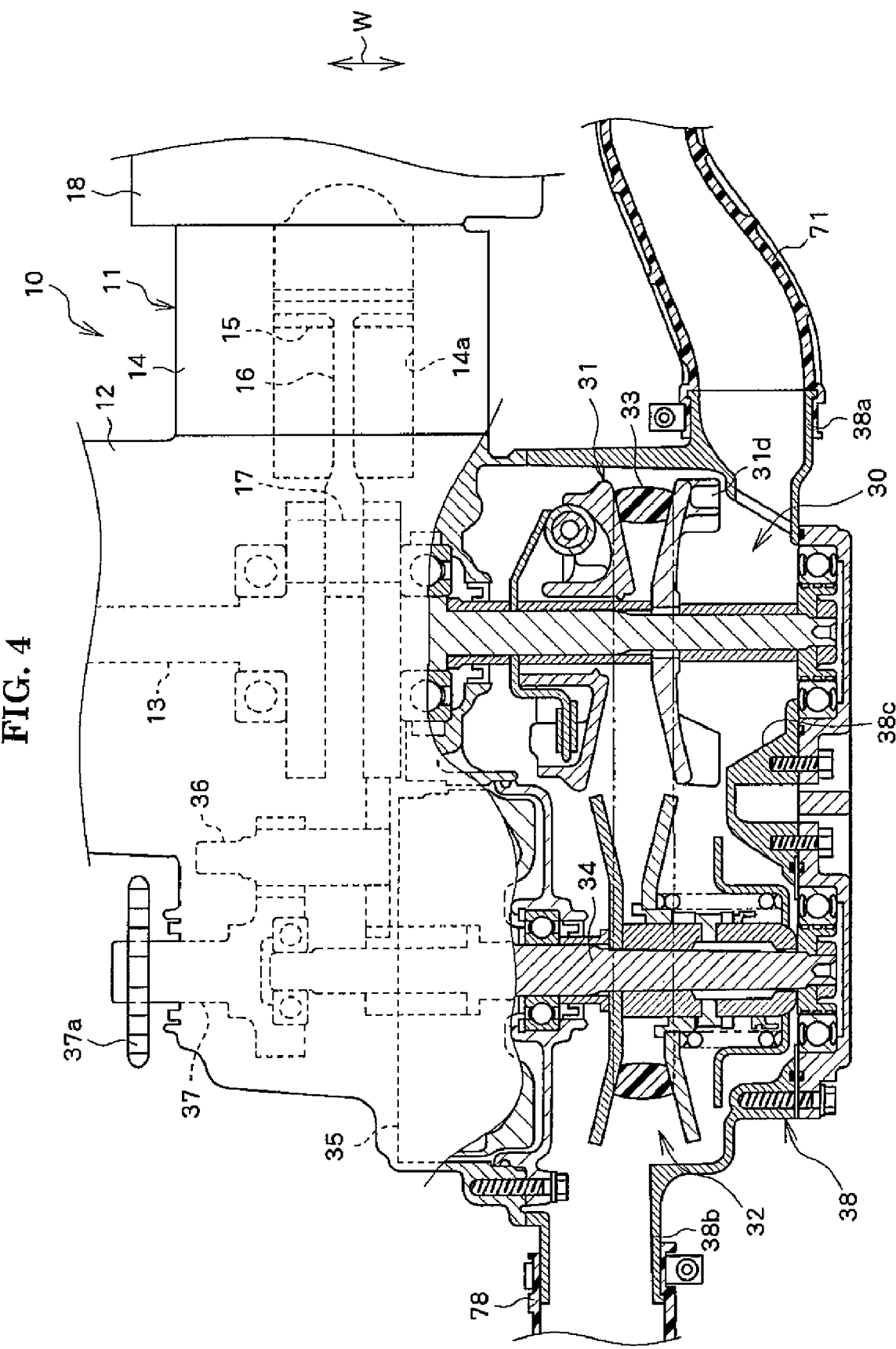
FIG. 4 is a partial sectional view of the engine unit.

An embodiment of the present invention is now described with reference to the drawings. FIG. 1 is a side view of a motorcycle 1 provided with an air cleaner 72 according to an embodiment of the present invention. Motorcycle 1 is an example of a straddle-type vehicle according to the invention. A straddle-type vehicle may be, for example, a motorcycle (including a motor scooter), a four-wheel buggy or a snowmobile. FIG. 2 is a side view showing a vehicle body frame 20, an engine unit 10 and an air cleaner 72 of motorcycle 1. FIG. 3 is a plan view thereof. FIG. 4 is a partial sectional view of engine unit 10. An air cleaner cleaning air sent into a transmission case 38 storing a continuously variable transmission 30 is now described.

As shown in FIGS. 2 and 3, vehicle body frame 20 is provided with a steering head 21 and a main frame 22. Vehicle body frame 20 is also provided with right and left seat rails 23, 23, stays 24, 24 and brackets 25, 25.

Steering head 21, which is provided on a front end part of vehicle body frame 20, rotatably supports a steering shaft 6 (FIG. 1). A front fork 7 supporting a front wheel 3 is connected to a lower end part of steering shaft 6. As shown in FIG. 2, a front end part of main frame 22 is connected to steering head 21. Main frame 22 slants downward toward a rear part of the vehicle body (a direction opposite to direction Fr) from the front end part of main frame 22. A rear (lower) end part 22b of main frame 22 is located in front of a rear wheel 4. A front end part of seat rail 23 is connected to an intermediate position of main frame 22 (FIG. 3). Seat rail 23 slants upward toward the rear part of the vehicle body from the front end part of seat rail 23. As shown in FIG. 2, a front end part of stay 24 is connected to rear end part 22b of main frame 22. Stay 24 slants upward from the front end part of stay 24 and has an upper end part connected to seat rail 23.

An upper edge part of bracket 25, which has a plate shape, is bonded to rear end part 22b of main frame 22. Bracket 25 downwardly extends from the upper edge part. A support part 25b supporting a pivot shaft is provided on an upper part of bracket 25. A rear arm 26 has a front end part mounted to the pivot shaft, and a rear end part supporting the axle of rear wheel 4. Rear arm 26 and rear wheel 4 swing on the pivot shaft independently of engine unit 10.

Engine unit 10, which is disposed in front of rear wheel 4, is supported by vehicle body frame 20. An upper wall of a crank case 12 of engine unit 10 is mounted to brackets 22e and 22f provided on main frame 22. A lower part of crank case 12 is mounted to a support part 25a provided on the lower part of bracket 25.

As shown in FIG. 4, engine unit 10 includes an engine 11 and belt type continuously variable transmission 30. Engine 11 includes crank case 12, a crankshaft 13, a cylinder block 14 and a piston 15. A cylinder 14a is formed in cylinder block 14. Combustion of a mixture of air and fuel sent into cylinder 14a causes reciprocating movement of a piston 15 in cylinder 14a. Piston 15 is connected to crankshaft 13, and reciprocating movement of piston 15 is converted into rotational movement by crankshaft 13. Crankshaft 13, which extends in a vehicle width direction, is supported by crank case 12 located in the back of cylinder block 14. As shown in FIGS. 2 and 3, an air cleaner 45 cleaning air sent to engine 11 is disposed above and obliquely with respect to engine 11. Air is sent from air cleaner 45 into cylinder 14a through a throttle body 42 and an air intake pipe 41.

As shown in FIG. 4, continuously variable transmission 30 has a driving side pulley 31 and a driven side pulley 32. Driving side pulley 31, which is provided on crankshaft 13, rotates with crankshaft 13. Driven side pulley 32, which is provided on a driven shaft 34 disposed in the back of crankshaft 13, rotates with driven shaft 34. A belt 33 transmitting torque to driven side pulley 32 from driving side pulley 31 is wound around driving side pulley 31 and driven side pulley 32. Continuously variable transmission 30 slows down and transmits rotation of crankshaft 13 to driven shaft 34.

Rotation of driven shaft 34 is transmitted to an output shaft 37 disposed coaxially with driven shaft 34 through an automatic clutch 35 provided on driven shaft 34 and an intermediate shaft 36 disposed in front of driven shaft 34. Rotation of a sprocket 37a mounted to output shaft 37 is transmitted to a sprocket rotating with an axle 4a of rear wheel 4 through a chain.

As shown in FIG. 2, engine unit 10 includes transmission case 38 covering continuously variable transmission 30 from the side. As shown in FIG. 3, transmission case 38 is located on the outer side of main frame 22 in the vehicle width direction (direction W1). As shown in FIGS. 1 and 3, transmission case 38 is covered with a cover 95 from the outer side in the vehicle width direction.

As shown in FIG. 2, an exhaust port 38b projected in an upwardly slanting direction is formed on the outer side of main frame 22 in the vehicle width direction in the rear part of transmission case 38. An air exhaust duct 78 discharging air in transmission case 38 is connected to exhaust port 38b. Air exhaust duct 78 slants upward from exhaust port 38b on the outer side of main frame 22 in the vehicle width direction.

An intake port 38a projected in the forward direction is formed in the front part of transmission case 38. An air intake passage 70 sending outside air for cooling belt 33 to transmission case 38 is connected to intake port 38a. Air intake passage 70 slants upward toward the front part of the vehicle body from intake port 38a on the outer side of cylinder block 14 of engine 11 and air cleaner 45 in the vehicle width direction.

As shown in FIG. 2, an air intake passage 70 for the transmission comprises an air intake duct 71 and a tip duct 77. Air cleaner 72 is disposed between air intake duct 71 and tip duct 77. Air intake duct 71 is connected to and slants upward from intake port 38a on the outer side of cylinder block 14 in the vehicle width direction. Air cleaner 72 is mounted to the upper end of air intake duct 71. Tip duct 77 taking in outside air into air cleaner 72 is mounted to the upper end part of air cleaner 72.

Figure 5:
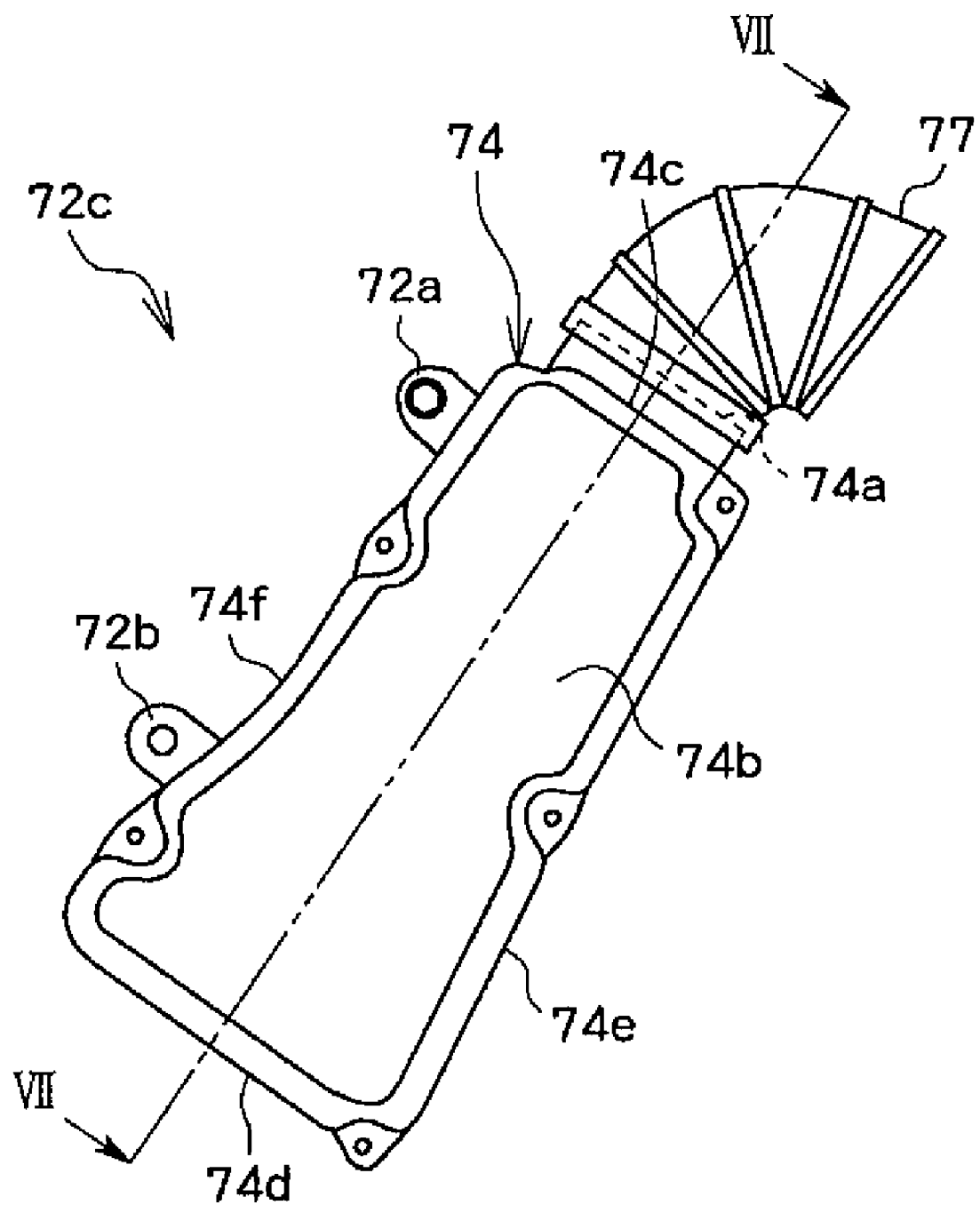
FIG. 5 is a right side view of the air cleaner.
Figure 6:
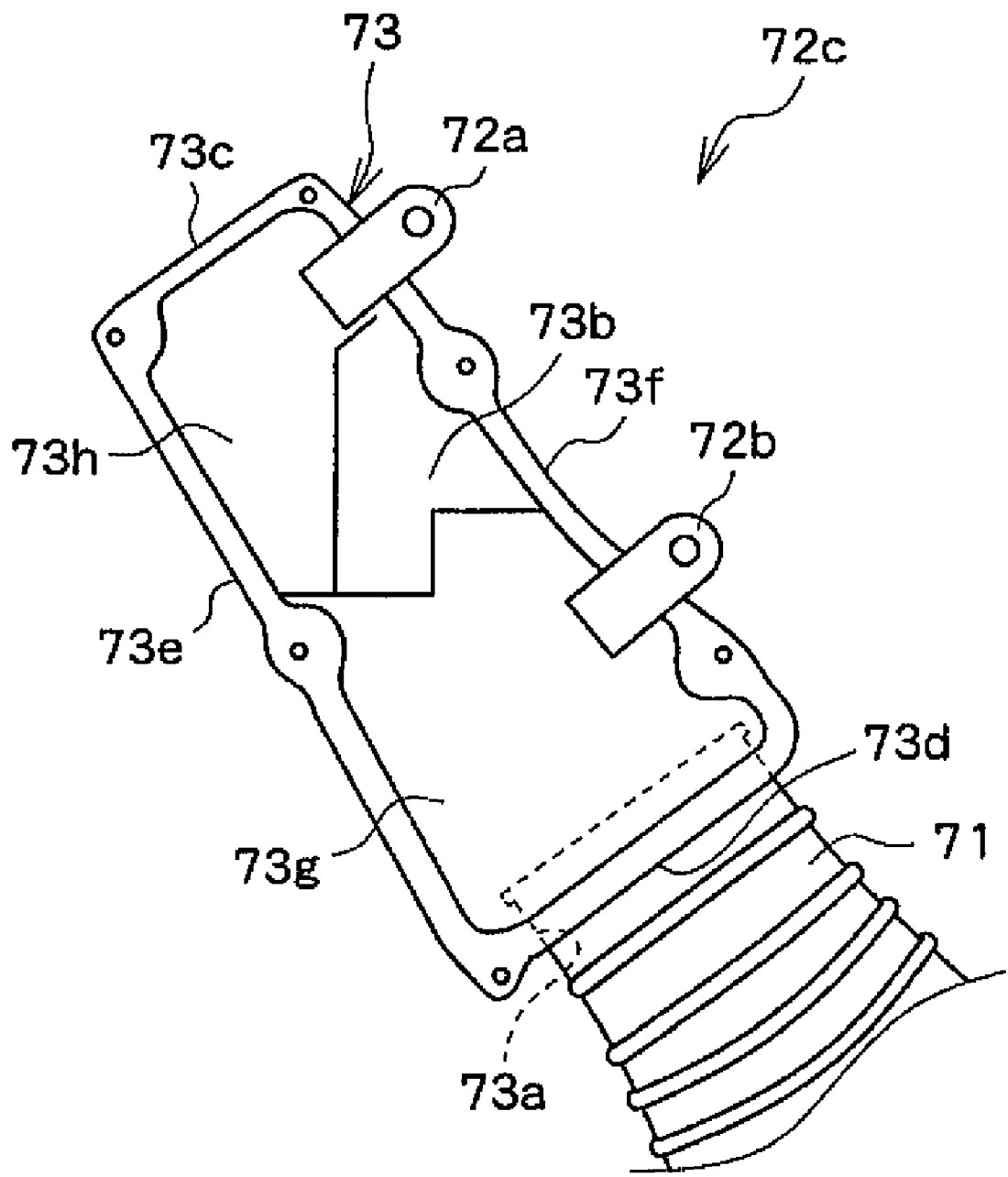
FIG. 6 is a left side view of the air cleaner.
Figure 7:
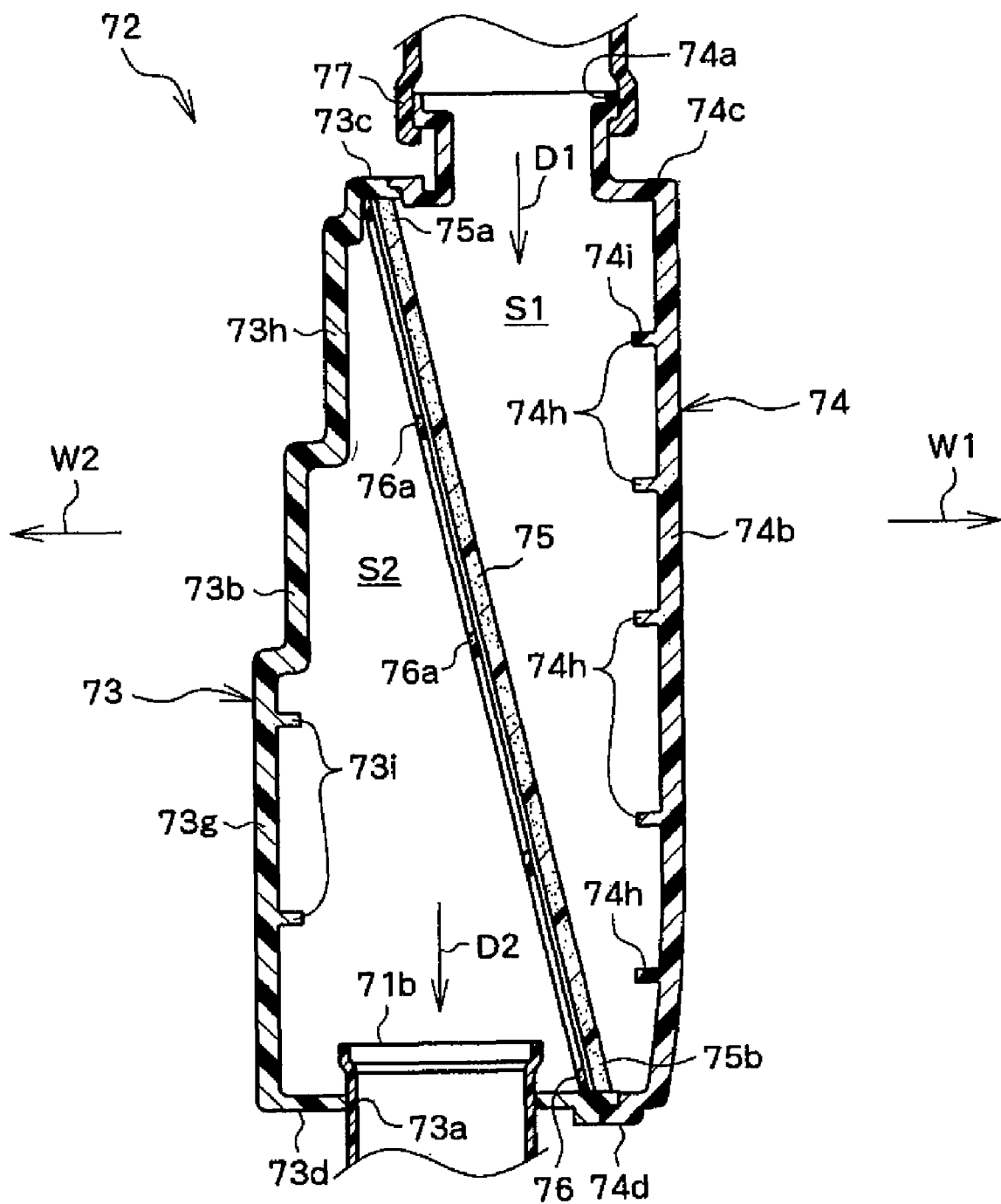
FIG. 7 is a sectional view taken along line VII-VII of FIG. 5.

Air cleaner 72 is now described in detail. As shown in FIG. 2 or 3, air cleaner 72, which slants upward toward the front part of the vehicle body, has an almost rectangular parallelepiped shape, and is disposed on the outer side of air cleaner 45 for the engine in the vehicle width direction. Air cleaner 72 includes a filter 75 disposed in a case 72c. Case 72c is supported by air cleaner 45 for the engine and vehicle body frame 22. As shown in FIG. 3, upwardly projecting mounting parts 72a and 72b are formed on case 72c. Mounting part 72a is mounted to the outer wall of air cleaner 45 for the engine. Mounting part 72b is mounted to a bracket 22j extending from main frame 22 in the vehicle width direction. FIG. 5 is a right side view of air cleaner 72. FIG. 6 is a left side view of air cleaner 72. FIG. 7 is a sectional view taken along line VII-VII of FIG. 5.

Case 72c is separatable in the horizontal (vehicle width) direction. As shown in FIGS. 5-7, case 72c includes a case body 73 supported by air cleaner 45 for the engine and vehicle body frame 22, and a case cover 74 mounted to case body 73. An intake port 74a connected to tip duct 77 leads outside air into case 72c. An exhaust port 73a is connected to transmission case 38 through air intake duct 71 on the side opposite to intake port 74a. Air in case 72c is discharged from exhaust port 73a, and is then sent into transmission case 38. Intake port 74a is formed in case cover 74, and exhaust port 73a is formed in case body 73.

As shown in FIG. 7, a filter 75 extends inside of air cleaner 72 to the exhaust port 73a side from the intake port 74a side. Filter 75 divides the inside of air cleaner 72 into a suction side air chamber S1 into which outside air flows from intake port 74a and a discharge side air chamber S2 discharging air from exhaust port 73a. Air cleaner 72, which slants upward toward the front part of the vehicle body, has an almost rectangular parallelepiped shape. Filter 75 extends in the longitudinal direction of the vehicle body in case 72c of air cleaner 72 (FIG. 3). The outer wall of suction side air chamber S1 is constituted by case cover 74, and the outer wall of discharge side air chamber S2 is constituted by case body 73.

Figure 8:
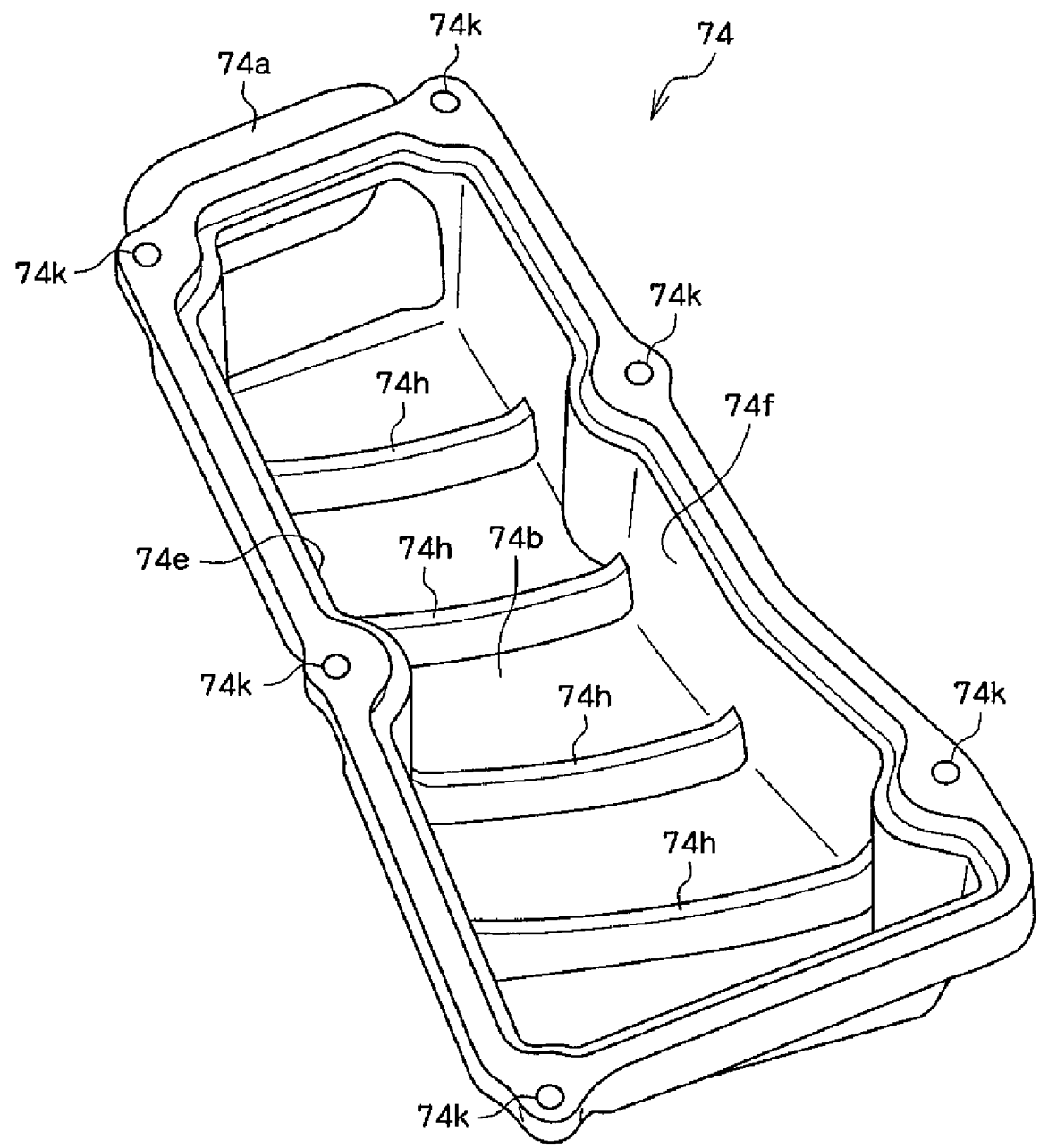
FIG. 8 is a perspective view of a case cover constituting the air cleaner.

Case cover 74 is now described. FIG. 8 is a perspective view of case cover 74 viewed from the inner side. As shown in FIGS. 7 and 8, case cover 74, which has an opened side surface, has an almost rectangular parallelepiped shape. Case cover 74 includes a side wall part 74b having an almost rectangular shape, an upper wall part 74c rising from a periphery edge of side wall part 74b, a lower wall part 74d facing upper wall part 74c, a front wall part 74e slanting upward toward upper wall part 74c from lower wall part 74d, and a back wall part 74f facing front wall part 74e and slanting upward toward upper wall part 74c from lower wall part 74d.

As shown in FIG. 7, the width (length in the vehicle width direction) of upper wall part 74c is larger than that of lower wall part 74d. Upwardly projecting intake port 74a is formed on upper wall part 74c, and the end part of tip duct 77 is mounted to intake port 74a.

As shown in FIG. 7, side wall part 74b, which slants upward toward upper wall part 74c from lower wall part 74d, faces filter 75. Side wall part 74b is disposed so that a distance between side wall part 74b and filter 75 gradually decreases to the back (lower wall part 74d side) of suction side air chamber S1 from intake port 74a. Side wall part 74b is substantially parallel with the inflow direction D1 of air inflowing from intake port 74a. On the other hand, filter 75 is disposed obliquely to the inflow direction of air so that its lower end edge 75b is located on the outer side (direction W1) relative to its upper end edge 75a in the vehicle width direction.

As shown in FIGS. 7 and 8, a plurality (five) of ribs 74h rising towards filter 75 from side wall part 74b are formed on the inner side of side wall part 74b. Ribs 74h extend in a direction crossing the inflow direction D1 of air inflowing from intake port 74a. Each of ribs 74h has a periphery surface on which a plane 74i crossing inflow direction D1 is formed. Ribs 74h extend between front and rear wall parts 74e and 74f, and planes 74i of ribs 74h are orthogonal to air inflow direction D1.

Figure 9:
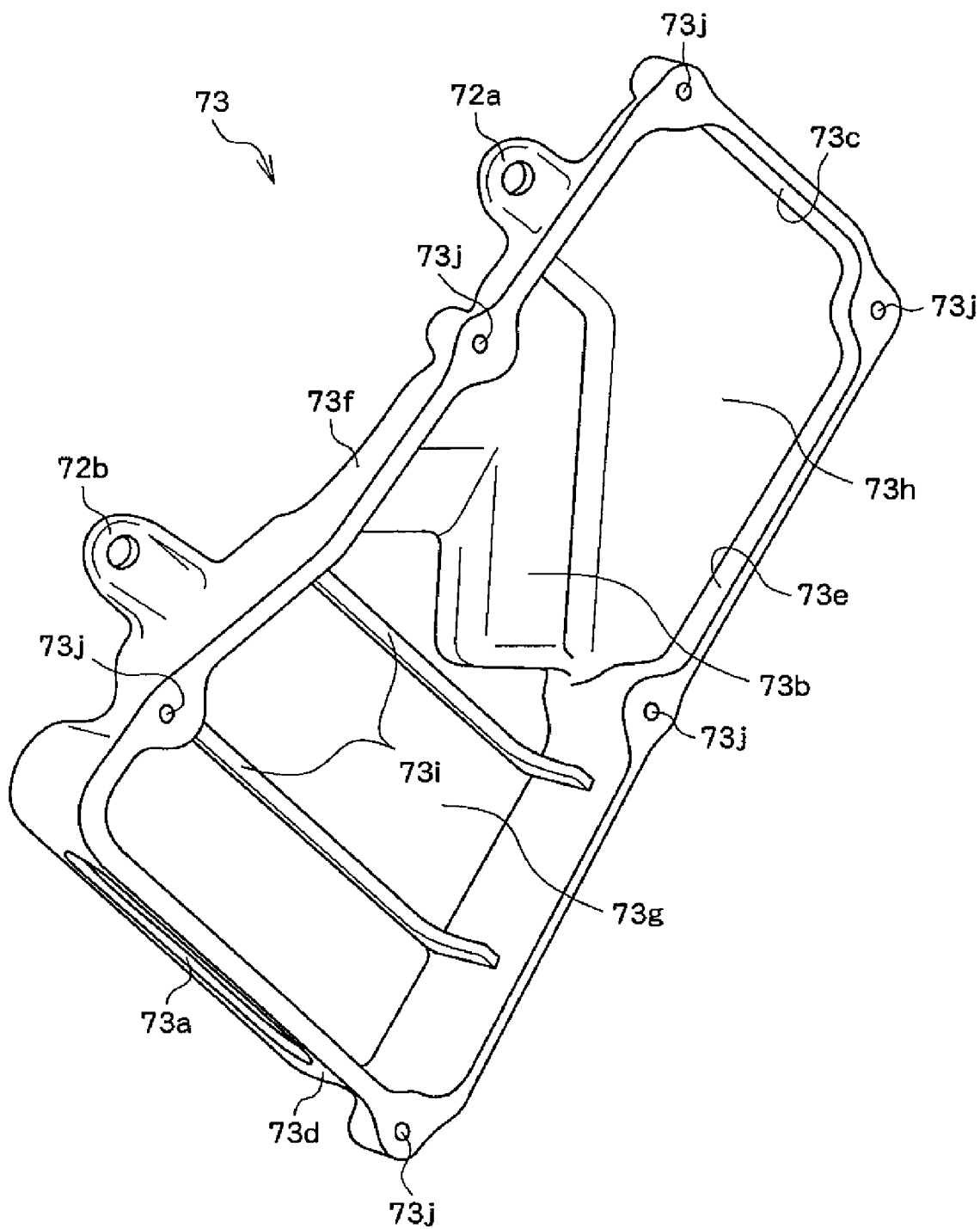
FIG. 9 is a perspective view of a case body constituting the air cleaner.

Case body 73 is now described. FIG. 9 is a perspective view of case body 73 viewed from the inner side thereof. As shown in FIGS. 7 and 9, case body 73, which has an opened side surface, has an almost rectangular parallelepiped shape as in case cover 74. Case body 73 includes a side wall part 73b having an almost rectangular shape, an upper wall part 73c rising from the periphery edge of side wall part 73b, a lower wall part 73d facing upper wall part 73c and rising from the periphery edge of side wall part 73b, a front wall part 73e slanting upward toward upper wall part 73c from lower wall part 73d, and a back wall part 73f facing front wall part 73e and slanting upward toward upper wall part 73c from lower wall part 73d.

As shown in FIG. 7, the width (length in the vehicle width direction) of lower wall part 73d is larger than that of upper wall part 73c. Exhaust port 73a is formed in lower wall part 73d, and an intake port 71b provided on the upper end of air intake duct 71 is fitted into exhaust port 73a.

As shown in FIGS. 6 and 7, side wall part 73b slants upward toward upper wall part 73c (the intake port 74a side) from lower wall part 73d (the exhaust port 73a side) at the opposite side of filter 75 from side wall part 74b of case cover 74. Side wall part 73b faces filter 75 and is disposed so that a distance between side wall part 73b and filter 75 gradually increases to the exhaust port 73a side from the intake port 74a side. Filter 75 is disposed obliquely to the outflow direction D2 of air flowing out from exhaust port 73a so that lower end edge 75b of filter 75 is located on the outer side (direction W1) relative to upper edge 75a of filter 75 in the vehicle width direction.

As shown in FIGS. 7 and 9, a plurality of level differences (two) are formed in side wall part 73b. A wall part 73g on the rear side of side wall part 73b is located on the center side (direction W2) relative to a wall part 73h on the front side of side wall part 73b in the vehicle width direction.

As shown in FIGS. 7 and 9, a plurality (two) of ribs 73i rising towards filter 75 from side wall part 73b are formed on the inner side of side wall part 73b. As shown in FIG. 9, ribs 73i extend between front wall part 73e and back wall part 73f.

Figure 10:
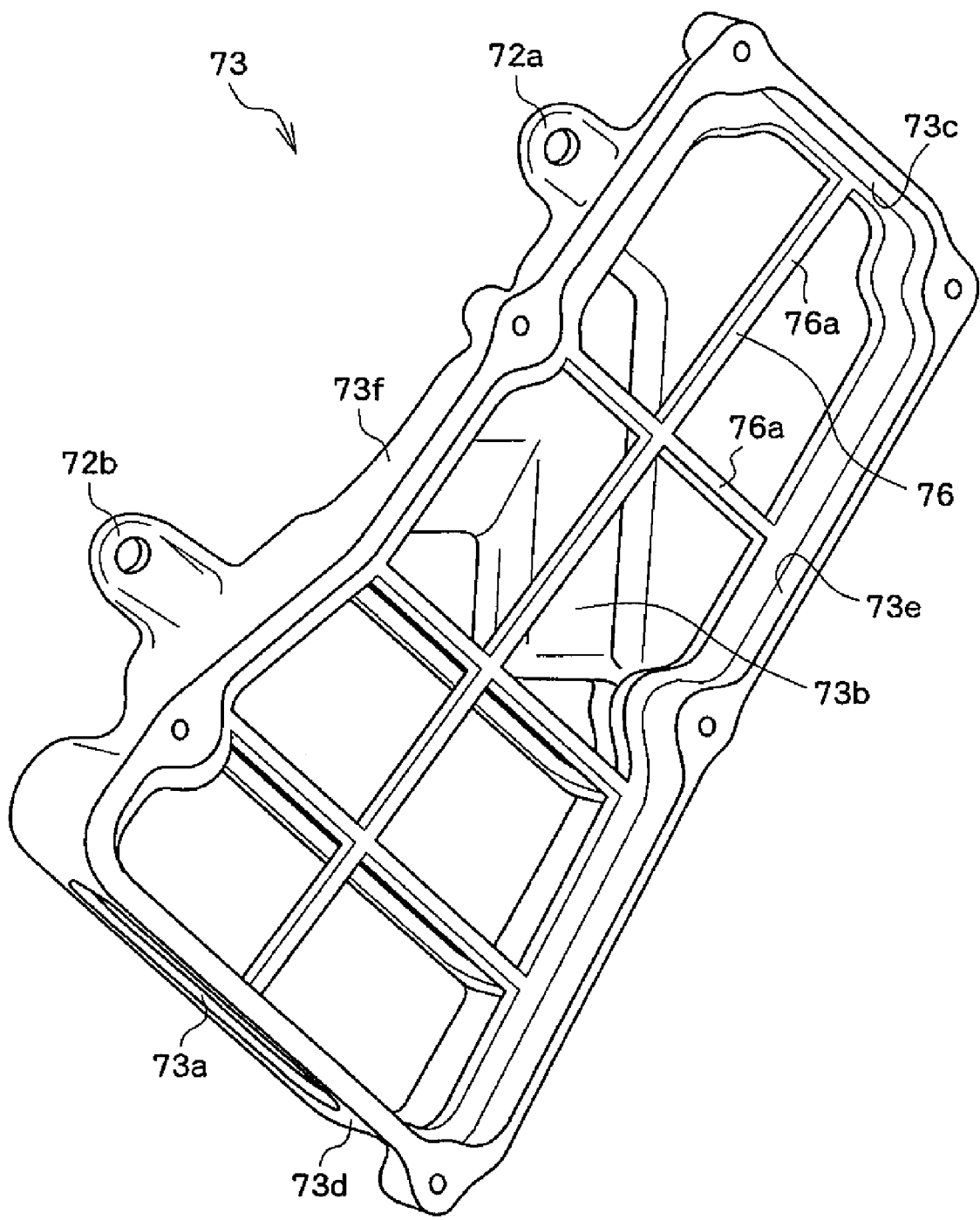
FIG. 10 is a perspective view of the case body to which a frame member supporting a filter is mounted.
Figure 11:
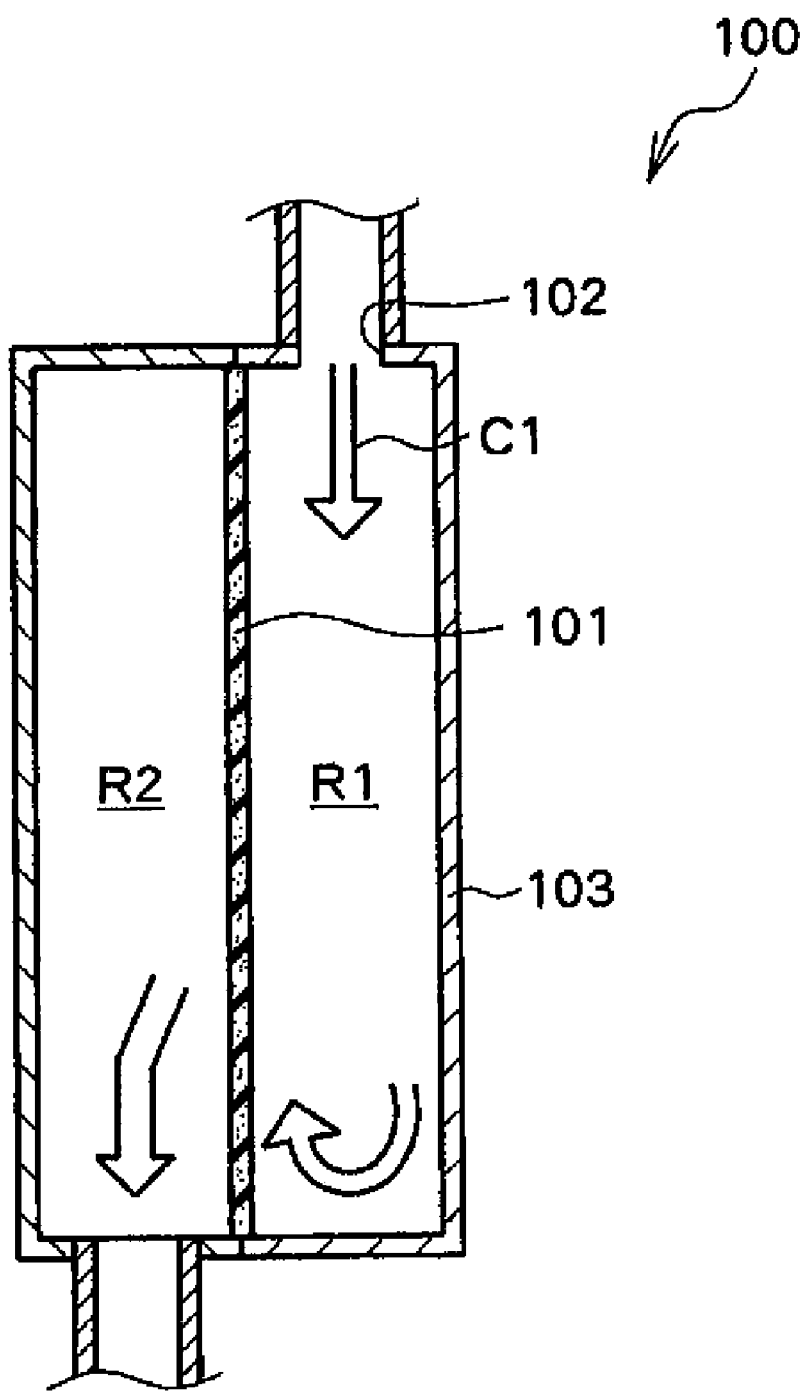
FIG. 11 is an example of an air cleaner.

As shown in FIG. 7, filter 75 is supported by a frame member 76 disposed in case body 73. FIG. 10 is a perspective view of case body 73 to which frame member 76 is mounted. As shown in FIG. 10, frame member 76 is fitted into a region formed by wall parts (upper wall part 73c, lower wall part 73d, front wall part 73e and back wall part 73f) erected from a periphery of side wall part 73b of case body 73. Frame member 76 has a supporting part 76a extending between lower wall part 73d and upper wall part 73c and between back wall part 73f and front wall part 73e. Filter 75 blocks the opened side surface of case body 73 to which case cover 74 is mounted and is supported by supporting part 76a of frame member 76.

As shown in FIGS. 8 and 9, a plurality (six) of mounting parts 73j are formed on the periphery of case body 73. Mounting parts 74k are provided in case cover 74 at positions corresponding to mounting parts 73j. Case cover 74 is mounted to case body 73 by bolting mounting parts 73j to mounting parts 74k.

In air cleaner 72 described above, the distance between side wall part 74b of case cover 74 and filter 75 gradually decreases to the back of suction side air chamber S1 from intake port 74a, and the distance between side wall part 73b of case body 73 and filter 75 gradually increases to exhaust port 73a. A large area of filter 75 is thereby secured and air smoothly flows to discharge side air chamber S2 from suction side air chamber S1.

In air cleaner 72, filter 75 is disposed obliquely to incoming direction D1 of outside air from intake port 74a. This simplifies the shape of case cover 74 and decreases the distance between filter 75 and side wall part 74b of case cover 74 to the back of suction side air chamber S1.

In air cleaner 72, filter 75 is disposed obliquely to direction D2 of air flowing out from exhaust port 73a. This simplifies the shape of case body 73 and increases the distance between filter 75 and side wall part 73b of case body 73 to exhaust port 73a.

In air cleaner 72, ribs 74h rising towards filter 75 side and extending in a direction crossing inflow direction D1 of air from intake port 74a are formed on the inner wall of case 72c. This further assists in the smooth flow of air to discharge side air chamber S2 from suction side air chamber S1.

In motorcycle 1, air intake passage 70 extends in the longitudinal direction of the vehicle, and air cleaner 72 is set in an intermediate position of air intake passage 70. Filter 75 of air cleaner 72 extends in the longitudinal direction of the vehicle body. This suppresses an increase in width of the vehicle body.

The present invention is not limited to air cleaner 72 described above, and various modifications can be carried out. For example, in air cleaner 72, the distance between side wall part 74b of case cover 74 and filter 75 gradually decreases to the back of suction side air chamber S1 by inclining filter 75 to the inflow direction of air. However, for example, filter 75 may instead be disposed in parallel to air inflow direction D1 and the wall part of the case cover may be inclined to air inflow direction D1 to gradually decrease the distance between the wall part of the case cover and filter 75 to the back of suction side air chamber S1.

In air cleaner 72, filter 75 is inclined to the inflow direction of air to gradually increase the distance between side wall part 73b of case body 73 and filter 75 to exhaust port 73a. However, for example, filter 75 may instead be disposed in parallel to air outflow direction D2 and the wall part of the case body may be inclined to air outflow direction D2 to gradually increase the distance between the wall part of the case body and the filter to the exhaust port.

The invention claimed is:

1. An air cleaner comprising:
    a case;
    an intake port leading outside air into the case;
    an exhaust port provided on a side of the case opposite to the intake port; and
    a filter dividing the case into a suction side air chamber into which outside air flows from the intake port and an exhaust side air chamber discharging air from the exhaust port, wherein
    the filter extends from an upper end edge adjacent to the intake port to a lower end edge adjacent to the exhaust port;
    a distance between a wall part of the suction side air chamber and the filter gradually decreases toward a back of the suction side air chamber from the intake port;

a distance between a wall part of the exhaust side air chamber and the filter gradually increases to the exhaust port;

a first plurality of ribs extend from the wall part of the suction side air chamber in a direction crossing an inflow direction of outside air from the intake port; and the first plurality of ribs are arranged between the upper end edge and the lower end edge of the filter to assist in a smooth flow of air from the suction side air chamber toward the filter and to the exhaust side air chamber.

2. The air cleaner according to claim 1, wherein the filter is disposed obliquely to the inflow direction of outside air from the intake port.

3. The air cleaner according to claim 1, wherein the filter is disposed obliquely to an outflow direction of air from the exhaust port.

4. The air cleaner according to claim 1, wherein a second plurality of ribs extend from the wall part of the exhaust side air chamber in a direction crossing an outflow direction of air from the exhaust port, the second plurality of ribs are arranged between the upper end edge and the lower end edge of the filter.

5. The air cleaner according to claim 1, wherein the exhaust port is connected to a transmission case storing a continuously variable transmission.

6. An engine unit comprising the air cleaner according to claim 1, and further comprising:

a transmission case leading outside air from the air cleaner; and a continuously variable transmission stored in the transmission case.

7. A straddle-type vehicle comprising the air cleaner according to claim 1.

8. The straddle-type vehicle according to claim 7, further comprising an air intake passage extending in a longitudinal direction of the vehicle, wherein the air cleaner is set in an intermediate position of the air intake passage, and the filter extends in the longitudinal direction of the vehicle.

* * * * *